United States Patent
Krause

(10) Patent No.: US 7,061,621 B2
(45) Date of Patent: Jun. 13, 2006

(54) INTERFEROMETRIC-BASED DEVICE AND METHOD FOR DETERMINING CHROMATIC DISPERSION OF OPTICAL COMPONENTS USING A POLARIMETER

(75) Inventor: Egbert Krause, Burgstadt (DE)

(73) Assignee: Thorlabs, Inc., Newton, NJ (US)

( * ) Notice: Subject to any disclaimer, the term of this patent is extended or adjusted under 35 U.S.C. 154(b) by 71 days.

(21) Appl. No.: 10/783,663

(22) Filed: Feb. 20, 2004

(65) Prior Publication Data
US 2004/0165192 A1 Aug. 26, 2004

(30) Foreign Application Priority Data
Feb. 21, 2003 (EP) .................. 03003925

(51) Int. Cl.
*G01B 9/02* (2006.01)
(52) U.S. Cl. ...................... 356/491; 356/477
(58) Field of Classification Search ............... 356/491
See application file for complete search history.

(56) References Cited

U.S. PATENT DOCUMENTS

| 4,750,833 A | 6/1988 | Jones ..................... 356/73.1 |
| 6,204,924 B1 | 3/2001 | Cyr ......................... 356/453 |
| 6,606,158 B1* | 8/2003 | Rosenfeldt et al. ......... 356/477 |
| 6,856,398 B1* | 2/2005 | Ruchet ...................... 356/453 |
| 6,856,400 B1* | 2/2005 | Froggatt .................... 356/477 |
| 2002/0051129 A1 | 5/2002 | Chae et al. ................ 356/73.1 |
| 2002/0154316 A1 | 10/2002 | Davidson et al. ........... 356/477 |
| 2002/0186437 A1 | 12/2002 | Sasaoka ..................... 359/161 |
| 2002/0191190 A1 | 12/2002 | Cierullies et al. .......... 356/477 |
| 2003/0193667 A1 | 10/2003 | Krause et al. ............. 356/366 |
| 2003/0223073 A1* | 12/2003 | VanWiggeren et al. ..... 356/477 |

FOREIGN PATENT DOCUMENTS

| EP | 0 484 913 A2 | 5/1992 |
| EP | 0 553 460 A2 | 8/1993 |
| EP | 1 113 250 A1 | 7/2001 |
| EP | 1 191 321 A1 | 3/2002 |
| EP | 1 207 377 A2 | 5/2002 |
| EP | 1 369 662 A2 | 12/2003 |
| WO | WO 99/56360 A1 | 11/1999 |
| WO | WO 03/007509 A2 | 1/2003 |

OTHER PUBLICATIONS http://stsdas.stsci.edu/cgi-bin/gethelp.cgi?polarimetry.

(Continued)

*Primary Examiner*—Gregory J. Toatley, Jr.
*Assistant Examiner*—Denise B Anderson
(74) *Attorney, Agent, or Firm*—Finnegan, Henderson, Farabow, Garrett & Dunner, L.L.P.

(57) ABSTRACT

It is possible to improve the manner in which the chromatic dispersion of a sample (4) is determined. To this end, the sample (4) is irradiated in an interferometer (10), with the light of a radiation source (1). A downstream polarimeter (50) measures both the power changes and the polarization changes of the interference radiation. In the downstream evaluation unit (7) the wavelength-dependent chromatic dispersion can be determined.

4 Claims, 2 Drawing Sheets

OTHER PUBLICATIONS

Figure 1:
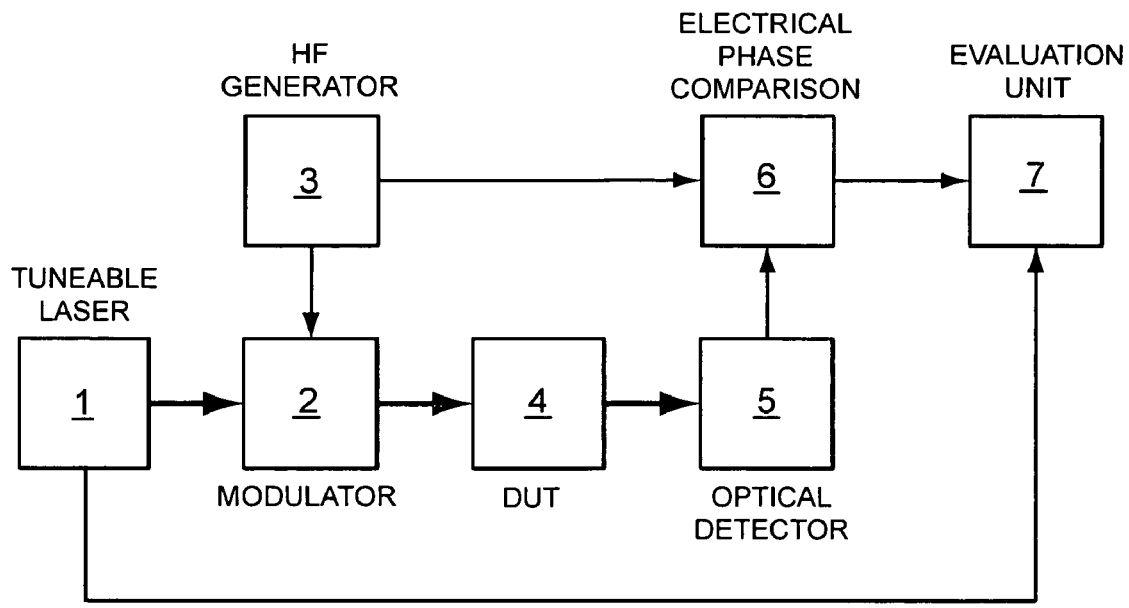

Agilent Technologies, Inc.; Agilent 11980A, Fiber-Optic Interferometer, Product Overview, May 15, 2002.

Test & Measurement World, Newton, MA, May 1, 2002.

S. Dyer et al. "Fast and accurate characterization of optical components using low-coherence interferometry," *Conference on Lasers and Electro-Optics*, Pacific Rim, China, Japan Technical Digenst, vol. 1, pp. 478-479 (Jul. 2001).

R. Craig, "Accurate Spectral Characteristics of Polarization Dependent Loss," *Symposium on Optical Fiber Measurements*, NIST Special Publication 953, pp. 121-124 (Sep. 2000).

Examination Report issued in EP 03 003 925.9 on Feb. 21, 2005 with translation.

* cited by examiner

INTERFEROMETRIC-BASED DEVICE AND METHOD FOR DETERMINING CHROMATIC DISPERSION OF OPTICAL COMPONENTS USING A POLARIMETER

This application claims priority to European Patent Application No. 030033925.9 filed Feb. 21, 2003, which is incorporated herein by reference in its entirety for all purposes.

DESCRIPTION

The present invention relates to a device for determining the chromatic dispersion of a sample or optical component with a radiation source for the emittance of a radiation with different wavelengths; an interferometer apparatus, which is radiatable by a radiation source, for generating a sample-specific interference radiation; a measurement apparatus, with which power changes and polarisation changes of the interference radiation are measurable; and an evaluation apparatus, with which the chromatic dispersion of the sample is determinable on the basis of the power changes and/or polarisation changes. Moreover, the present invention relates to a corresponding method for determining the chromatic dispersion of a sample.

On test and measurement apparatuses for the characterisation of optical components, two trends to reduce the measurement time can be observed in the development of measurement technology:

1. Trend Towards "Swept-wavelength" Systems

With these systems the measurement parameters are not measured point-wise while the wavelength is changed step-wise; rather, a tuneable laser is continuously tuned across the wavelength range to be analysed while the data is recorded.

2. Trend Towards All-parameter Analysers

A measurement system of this kind is capable of picking up, as far as possible, all relevant parameters in a short time and, where appropriate, simultaneously with only one laser scan across the entire spectral measurement range. In the case of optical components the relevant measurement parameters include, among others:

IL insertion loss

RL return loss

PDL polarisation dependent loss

PMD polarisation mode dispersion comprising the DGD (differential group delay) and the PSPs (principal states of polarization), and CD the chromatic dispersion or group delay.

The measurement methods or measurement apparatuses described below reflect these trends.

With regard to the CD (chromatic dispersion) measurement, two different measurement methods are known in principle. One is based on the electrical measurement and the other on the optical measurement of the phase delay time.

A device for the electrical determination of the phase delay time is shown in FIG. 1. The radiation of a tuneable laser 1 is modulated sinusoidally in a modulator, e.g. in a frequency range of 0.1 to 5 GHz. To this end the modulator 2 is controlled by a high-frequency generator 3. The modulated light is sent through a sample 4 (DUT, device under test). An optical detector 5 detects the modulated light influenced by sample 4 and transmits a corresponding electrical signal to a comparator 6. Said comparator compares the phase of the electrical signal of the optical detector 5 with the phase signal received from the high-frequency generator 3. From this electrical phase comparison and the wavelength information of the tuneable laser 1 an evaluation unit 7 determines the chromatic dispersion.

On its way through the sample, the light, or measurement object DUT 4, experiences a delay, which shows in a group delay. Said group delay is calculated from the derivative of the phase velocity and is wavelength-dependent. The derivative of the wavelength-dependent group delay gives the wavelength-dependent chromatic dispersion of the measurement object 4 with the dimension ps/nm.

A device for the optical determination of the phase delay time is shown in FIG. 2, again in a block diagram. Here, the measurement object 4 is analysed in an interferometer 10. There, the light from the tuneable laser 1 is split up in a first coupler 11. This creates two optical paths—the reference arm 12 and the measurement arm 13 (in which lies the measurement object 4). A second coupler 14 causes interference of the two beams from the reference arm 12 and the measurement arm 13. Through this combination the two signal field strengths are added. The conversion into an electrical superimposition signal—which is dependent on the phase position, on the attenuation and polarisation transformation in both interferometer arms, and on the wavelength—occurs in the optical detector 5 that follows. The superimposition signal in turn, together with the wavelength information of the tuneable laser 1, is transmitted to the evaluation unit 7 for determining the chromatic dispersion. When the wavelength is tuned, there results a periodic detector signal, whose period is connected with the group delay difference in both interferometer arms.

What is disadvantageous about this method is that only a total power from both interferometer arms is measured in the optical detector 5. For this, however, the relative position of the polarisations in both arms plays a decisive role. With the polarisation being the same, the biggest power fluctuations occur at changeable wavelengths. Phase determination is then easily possible. Contrary to this, no power fluctuations whatsoever occur in case of orthogonal polarisation at changeable wavelengths, but only polarisation fluctuations. In this case a phase determination is not possible.

Figure 3:
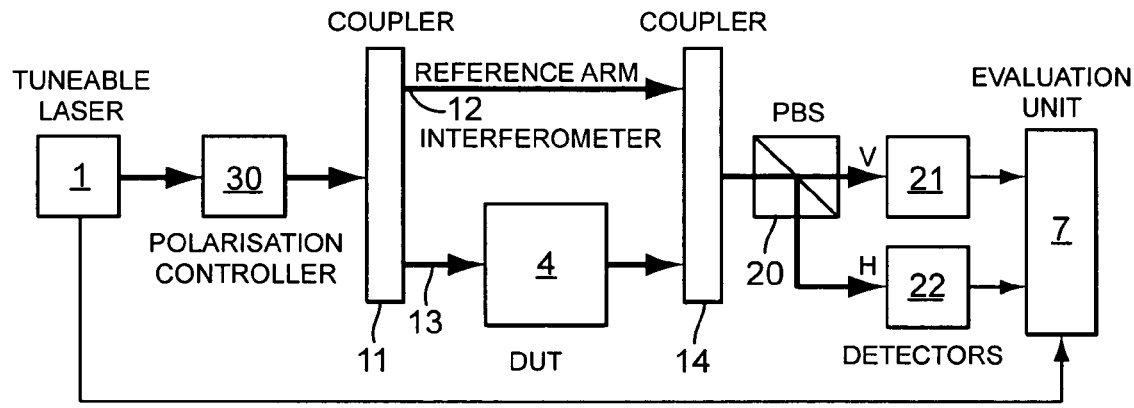

An improved version of this measurement device for determining the phase delay difference, or chromatic dispersion, therefore envisages that the optical detector 5 is designed in a polarisation-dependent way. One possibility for this consists in the use of a polarisation beam splitter (PBS) 20 including two optical detectors 21 and 22, as is shown in FIG. 3. Through the polarisation beam splitter 20 the superimposed light beam is broken down into two orthogonally polarised beam parts. The powers of these two partial beams, which are detected with the optical detectors 21 and 22, are each passed on to the evaluation unit 7.

With this measurement configuration a changing polarisation can be detected. The prerequisite for this is, however, that the two polarisations in the interferometer arms 12, 13 do not by chance correspond to the self-polarisation of the PBS 20. Because in this case every detector 21, 22 would measure the power in both interferometer arms 12, 13 a superimposition of both powers with a periodic superimposition result would not occur. For this reason, conventionally, a polarisation adjustment, e.g. through a polarisation controller 30, must be provided in this measurement configuration, which ensures that the power from the reference arm 12 divides itself approximately evenly to both detectors 21, 22. Only then is a phase comparison between both branches possible for any polarisation in measurement branch 13. An apparatus of this kind for measuring the optical characteristics of a measurement object is known from document EP1207 377A2.

Adjusting the polarisations in the two interferometer branches is, however, involves a relatively great deal of effort. It may not be assumed that a polarisation adjusted optimally at a start wavelength is retained at the end of the reference arm 12 at other wavelengths within the wavelength range to be examined. Generally, the polarisation, as a result of some minor PMD existing in the reference arm 12, will move away from its ideal condition.

Therefore, the object of the present invention is to propose a method and a device to be able to determine the chromatic dispersion more easily and avoid disadvantages as a result of the wavelength dependence of the polarisation adjustment. Moreover, the object is to eliminate disadvantages that could arise as a result of the limited optical quality (extinction ratio, ER) of the polarisation beam splitter 20.

According to the present invention, this object is achieved by a device for determining the chromatic dispersion of a sample with a radiation source for emitting a radiation with different wavelengths; an interferometer apparatus, which is irradiated by the radiation source in order to generate a sample-specific interference radiation; a measurement apparatus, with which power changes and polarisation changes of the interference radiation are measurable; and an evaluation apparatus, with which the chromatic dispersion of the sample are determinable on the basis of the power changes and polarisation changes, the measurement apparatus comprising a polarimeter.

Moreover, according to the present invention, a method for determining the chromatic dispersion of a sample is envisaged, by generating an electromagnetic beam of a radiation with different wavelengths, splitting the beam into a reference beam and a measurement beam with which the sample is irradiated, superimposing the reference beam and the measurement beam whilst maintaining an interference beam, measuring power changes and polarisation changes of the interference beam as a function of the wavelength of the radiation, and determining the chromatic dispersion of the sample on the basis of the power changes and/or polarisation changes, the measuring being performed using a polarimeter.

The polarimeter ensures that the wavelength-dependent fluctuations caused by the interference in the interferometer can be determined independent of the polarisation in the two interferometer branches. The fluctuations comprise power and/or polarisation fluctuations, dependent on the relative position of the two polarisations from the interferometer arms. If the polarisations are identical, only power fluctuations occur, in the case of orthogonal polarisations, only polarisation fluctuations are measurable. In the general case of random states of polarisation, both power and polarisation fluctuations occur simultaneously, both of which are picked up precisely by the polarimeter. No polarisation controller that ensures a certain polarisation in the detector unit needs to be provided in front of the interferometer.

Preferably, the polarimeter can be a complete polarimeter that provides measurement values for all four Stokes parameters. With said four Stokes parameters numerous optical characteristics of the measurement object are calculable.

The measurement data gained by the polarimeter can easily be recalculated as measurement data that a virtual polarisation beam splitter with an ideal power distribution would provide. The two orthogonal polarisations of the virtual polarisation beam splitter can be defined for any wavelength such that they break down the power from the reference arm into two partial powers of equal magnitudes and that maximum (virtual) power fluctuations are thus detectable. This way, the influence of the polarisation mode dispersion in the reference arm can be reduced. Preferably, the light source consists of a tuneable laser. Said tuneable laser has the advantage that it emits defined polarised light.

The analysis of the measurement results is based on the wavelength-dependent Stokes parameters $(S_0, S_1, S_2, S_3)(\lambda)$ gained by the polarimeter, each of which was determined in the reference scan and the measurements scan itself. Said measurement data can, for example, be traced back to the data which an idealised polarisation beam splitter would determine, so that the same mathematical calculation methods according to prior art could also be applied.

Figure 2:
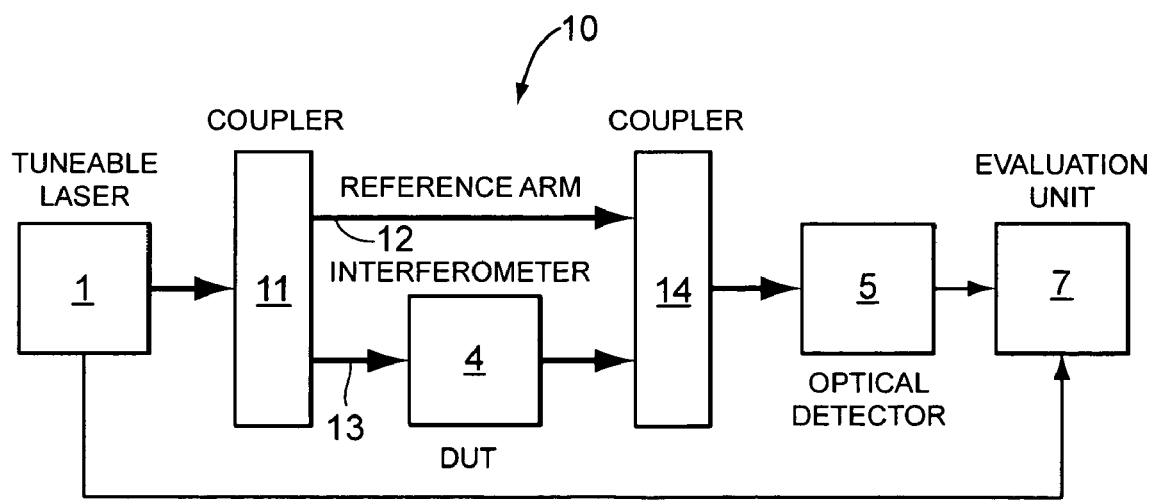
Figure 4:
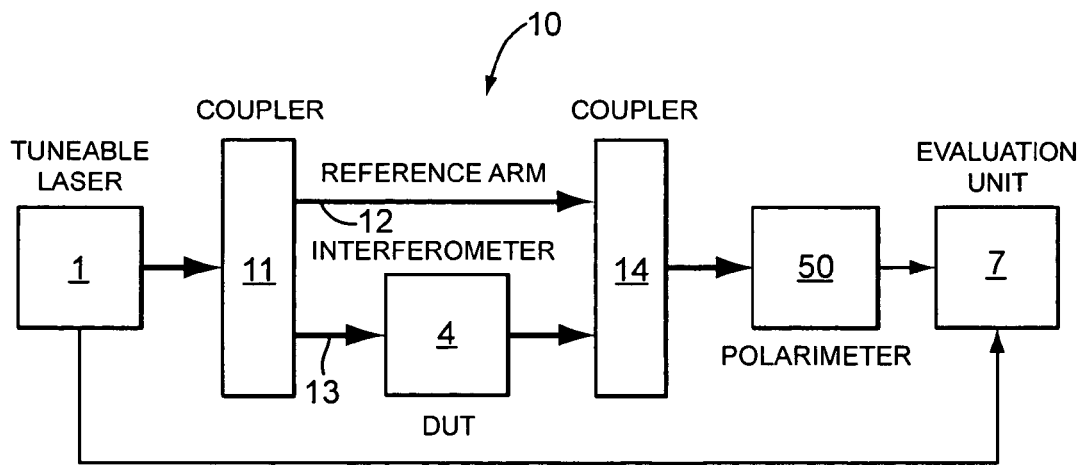

The present invention is explained in more detail using the drawings attached, which show:

FIG. 1 a block diagram of a measurement configuration to electrically determine the group delay according to prior art;

FIG. 2 a block diagram of a measurement configuration to optically determine the group delay according to prior art;

FIG. 3 a block diagram of an alternative measurement configuration to optically determine the group delay according to prior art; and FIG. 4 a block diagram of a measurement configuration to optically determine the group delay according to the present invention.

The embodiments described below are preferred embodiments of the present invention.

The structure of the measurement configuration shown in FIG. 4 essentially corresponds to that of FIG. 2. The elements with the same reference number have the same functions. As regards these components reference is therefore made to FIG. 2. According to the present invention, the optical detector from FIG. 2 is, however, replaced by a polarimeter 50. With reference to the embodiment of FIG. 3, polarimeter 50 replaces the polarisation beam splitter 20 including the two detectors 21 and 22. The polarimeter can fully replace the functionality of the polarisation beam splitter, because the parameters measured (four Stokes Parameter $S_0$, $S_1$, $S_2$ and $S_3$) provide information about the power and the polarisation, which, for orthogonal polarisations, can easily be divided into two powers. The polarimeter thus has the same input variables but more output variables than the polarisation beam splitter 20 with the two detectors 21 and 22. The polarimeter 50 can represent a virtual polarisation beam splitter PBS that has the following advantages:

The two orthogonal polarisation directions, into which the detected light can be mathematically divided, can be freely selected. For example, the directions H/V (horizontal/vertical), +45°/−45° or R/L (right/left) or any other direction pairs can be selected. The division of the light in the two polarisation directions can thus be selected so that the power from the reference arm 12 can always be ideally broken down 50:50 into both virtual partial powers. This way the two polarisation directions can be designed flexibly whilst retaining the 50:50 split, even if the polarisation in the reference arm of the interferometer changes during the wavelength scan. Wavelength-dependent changes of this kind cannot normally be avoided and result from a minor influence of the PMD in the reference arm 12. The disturbing effect of the PMD in the reference arm can, however, be eliminated with the aid of the polarimeter.

The polarimeter furthermore has the advantage that neither the polarisation in the reference arm nor the input polarisation of the interferometer has to be adjusted such that the power breakdown on the polarisation beam splitter becomes usable for both arms. The polarisation controller and the process of optimising the polarisation is thus no longer necessary with the use, according to the present invention, of the polarimeters. A polarimeter behind the DUT can, for example, already exist in the case of an all-parameter analyser, so that the CD measurement can be realised at a reasonable cost.

Another advantage of the use of the polarimeter consists in that the CD measurement can be performed more accurately. This is achievable if the polarimeter is calibrated very accurately (cf. parallel patent application of the applicant entitled "Method and Device for the Highly Accurate Calibration of Polarimeters"), so that one is not limited by the relatively low extinction values of 20 to 30 dB of a polarisation beam splitter.

The measurement process is then such that first, in a reference scan, the wavelength of the tuneable laser is moved across the range to be analysed, with the measurement path interrupted. In this process the polarimeter measures both the wavelength-dependent power and the wavelength-dependent states of polarisation. This information is contained in the wavelength-dependent Stokes parameters $(S_0, S_1, S_2, S_3)(\lambda)$. Thereafter the measurement arm is activated and a corresponding superimposition result is determined also in the form of the wavelength-dependent Stokes parameters $(S_0, S_1, S_2, S_3)(\lambda)$. These data allow a mathematical calculation of the wavelength-dependent group velocity, whose derivation directly gives the chromatic dispersion.

It must be considered that not only the CD but also the PMD contained in the measurement object contributes to the measurement result. Since the PMD in the shape of the wavelength-dependent DGD (differential group delay) and PSP (principal states of polarisation) is known in detail from standard measurement processes already carried out, the share of the PMD can be eliminated from the measurement results.

The invention claimed is:

1. Method for determining chromatic dispersion of a sample comprising:
   generating an electromagnetic beam of radiation comprising at least two various wavelengths;
   splitting the beam into a reference beam and a measurement beam to irradiate the sample;
   superimposing the reference beam and the measurement beam thereby forming an interference beam;
   measuring wavelength-dependent power changes and polarization changes of the interference beam by means of a polarimeter; and
   determining the chromatic dispersion of the sample on the basis of the power changes and the polarization changes,
   where two orthogonal states of polarization for determining the power changes are selected using said polarimeter so that power from reference arm of interferometer apparatus is broken down into virtual partial powers of approximately the same magnitude.

2. Method according to claim 1 where the electromagnetic beam is generated by a tunable laser.

3. Method according to claim 1 where the chromatic dispersion is determined from wavelength-dependent Stokes parameters by reference scan and measurement scan.

4. Method according to claim 2 where the chromatic dispersion is determined from wavelength-dependent Stokes parameters by reference scan and measurement scan.

* * * * *